US012799275B2

(12) United States Patent
Ostendorf

(10) Patent No.: US 12,799,275 B2
(45) Date of Patent: Nov. 17, 2026

(54) CROSS-LINKABLE ORGANOSILOXANE-MODIFIED REACTION RESINS

(71) Applicant: WACKER CHEMIE AG, Munich (DE)

(72) Inventor: Detlev Ostendorf, Dresden (DE)

(73) Assignee: Wacker Chemie AG, Munich (DE)

( * ) Notice: Subject to any disclaimer, the term of this patent is extended or adjusted under 35 U.S.C. 154(b) by 405 days.

(21) Appl. No.: 18/015,980

(22) PCT Filed: Jul. 21, 2020

(86) PCT No.: PCT/EP2020/070520
§ 371 (c)(1),
(2) Date: Jan. 13, 2023

(87) PCT Pub. No.: WO2022/017581
PCT Pub. Date: Jan. 27, 2022

(65) Prior Publication Data

US 2023/0272164 A1 Aug. 31, 2023

(51) Int. Cl.

| | |
|---|---|
| ***C08L 83/04*** | (2006.01) |
| ***C08G 73/06*** | (2006.01) |
| ***C08G 77/26*** | (2006.01) |
| ***C08K 7/02*** | (2006.01) |
| ***C08L 83/08*** | (2006.01) |

(52) U.S. Cl.
CPC ........... *C08G 73/065* (2013.01); *C08G 77/26* (2013.01); *C08K 7/02* (2013.01); *C08L 83/08* (2013.01); *C08L 2205/03* (2013.01)

(58) Field of Classification Search
CPC ........................................................ C08L 83/04
See application file for complete search history.

(56) References Cited

U.S. PATENT DOCUMENTS

2013/0037310 A1* 2/2013 Kimura .................... C08J 5/244
523/400
2015/0221527 A1* 8/2015 Morganelli .......... C08K 5/5435
523/466
2019/0023863 A1* 1/2019 Lesser .................... C08G 77/06

FOREIGN PATENT DOCUMENTS

CN 102884131 A 1/2013
KR 20130102466 A 9/2013

OTHER PUBLICATIONS

Primaset Cyanate Ester Resins brochure; arxada.com; Nov. 2022.*
Shixin Pei et al.,: "Thermal and water absorption properties of cyanate ester resins modified by fluoride-containing and silicone-containing components", Polymers Advanced Technologies, 2020, vol. 31, Wiley, pp. 1245-1255.
Dongxian, Zhuo, et al.: "Novel hyperbranched polyphenylsilsesquioxane-modified cyanate ester resins with improved toughness and stiffness", Polym Int 2011, vol. 60, published online in Wiley online Library Apr. 11, 2011 pp. 1277-1286.
Uhlig et al.: "Blends of tri-block copolymers and addition curing resins: Influence of block copolymer-resin compatibility on toughness and matrix properties on toughenability", Reactive and Functional Polymers, vol. 142, Sep. 2019, pp. 159-182.
Xu Yijun et al.,:"Overview of Industries Related to Petrochemicals—Fine Chemicals (I)", Shanghai Science Popularization Press, 1st edition, 1st printing, Jun. 1992, p. 56.

* cited by examiner

*Primary Examiner* — Margaret G Moore

(57) ABSTRACT

A cross-linkable composition along with processes for producing the same, uses for the same and articles made therefrom. The cross-linkable composition includes (A) at least one organic compound that is free of siloxane units having at least two reactive cyanate ester groups (="N≡C—O—") and (B) at least one cyclosiloxane having the general formula (I)

$$[R_aR^1_bSiO_{2/2}]_m. \quad (I)$$

Where R may be identical or different and represents monovalent, SiC-bonded, saturated aliphatic hydrocarbon radicals; where $R^1$ may be identical or different and represents monovalent, SiC-bonded, halogen- or phosphorus-substituted, aromatic hydrocarbon radicals; where a is 0, 1 or 2, preferably 0 or 1, particularly preferably 0; where b is 0, 1 or 2, preferably 1 or 2, particularly preferably 2; where m is 3, 4 or 5, preferably 3 or 4, particularly preferably 4; and where a+b is 2 and at least three radicals $R^1$ are present per siloxane molecule (B).

9 Claims, No Drawings

CROSS-LINKABLE ORGANOSILOXANE-MODIFIED REACTION RESINS

CROSS-REFERENCE TO RELATED APPLICATIONS

This application is a U.S. National Phase application of PCT Application No. PCT/EP2020/070520 filed on Jul. 21, 2020 the disclosure of which is incorporated by reference herein in its entirety.

The present invention relates to crosslinkable, organosiloxane-modified reaction resins having functional cyanate ester groups, to processes for the production thereof and to vulcanizates and composites obtainable therefrom.

Epoxy (EP) resins or epoxy resin systems are used in a numerous applications and have now become established in composite materials, for example in conjunction with glass, carbon or aramid fibers, as one of the most commonly used thermoset classes. In addition, the use of other organic resin systems such as cyanate ester (CE), bismaleimide (BMI), polyimide (PI), benzoxazine or phthalonitrile resins or mixed resin systems such as bis(benzocyclobutenimide) bismaleimide, cyanate ester-epoxide or bismaleimide-triazine (BT resins) as matrix resins in fiber composite materials, for example in carbon fiber reinforced plastics (CFRP), for use in industry, automaking and aerospace, has become increasingly important in recent years. Compared to epoxy resins the polymer matrix resins based on CE, BMI or PI for example exhibit, inter alia, very good mechanical properties, thermal resilience, long-term stability and high glass transition temperatures, which greatly expand their possible applications, particularly in the high temperature range. However, these so-called high-temperature thermosets also have disadvantages, for example increased brittleness due to the high crosslinking densities. In addition, the cured polymer networks sometimes show a high water absorption rate and, accordingly, insufficient hydrolytic stability. It would therefore be desirable to provide suitable modifiers for reducing water absorption for these resin systems already on the market to minimize their hydrolytic degradation, thus allowing the high-temperature thermosets obtainable therefrom to be commercially employed in demanding composite applications, preferably for the aerospace industry.

The curing of cyanate ester resins comprises trimerization of the reactive cyanate ester groups to afford cyclic triazine rings, thus forming a network having a high crosslinking density. The thermosets thus obtainable exhibit high mechanical strengths but also a high brittleness and undergo rapid decomposition by moisture.

The use of siloxane-containing components for impact modification and for improving the thermal and dielectric properties of the cyanate ester thermoset networks has already been described numerous times in the literature, but little is known about the effect of siloxanes on water absorption.

In Polym. Adv. Technol. 2020, 31, 1245-1255, the authors report on the effect of linear silicones having either terminal reactive silanol groups (≡Si—OH) or silane groups (≡Si—H) inter alia on the water absorption of vulcanized 2,2-bis(4-cyanatophenyl)propane. Compared to unmodified, crosslinked 2,2-bis(4-cyanatophenyl)propane (referred to as CR-0), the Si—H terminated silicone (designated CR-3) showed a small effect, and the Si—OH terminated silicone (referred to as CR-2) a significant effect, on water absorption.

*Polym. Int.* 2011; 60:1277-1286 also demonstrates the possibility of increasing both the impact strength and the flexural modulus of elasticity of the cured mixtures compared to the unmodified cyanate ester resin through copolymerization of 2,2-bis(4-cyanatophenyl)propane with polyphenylsilsesquioxane. The polyphenylsilsesquioxane modifiers are obtainable by acid-catalyzed hydrolysis and condensation of phenyltrimethoxysilane and contain a high content of reactive silicon-bonded methoxy and silanol groups.

However, the use of linear silicones or polyphenylsilsesquioxane with reactive alkoxy and/or silanol units as modifiers for cyanate ester resins has several disadvantages: Firstly, during the crosslinking reaction, the silanol groups can eliminate water which undesirably reacts with cyanate ester groups to form amine and gaseous carbon dioxide and causes bubble formation, and secondly the reactive silanol groups and the silicon-bonded reactive methoxy groups have an adverse effect on the thermooxidative stability of the siloxanes and on the triazine-thermoset network. Furthermore, the modifiers mentioned have a low compatibility with the cured cyanate ester-thermoset network, with the result that curing of the cyanate ester results in macroscopically, i.e. visually, heterogeneous, cloudy vulcanizates which sweat the silicone in a manner which is undesirable and has adverse effects on water absorption.

It is an object of the invention to modify organic resins having reactive cyanate groups in such a way that after the shaping and curing process thermosets having reduced water absorption rates and thus improved hydrolysis resistance and optionally improved fracture toughness and optionally improved dielectric properties are obtained, while the advantageous properties intrinsic to the thermosets, such as heat distortion resistance, mechanical strength, thermooxidative resistance and chemicals resistance, are largely also retained in the thermosets thus modified.

This object is achieved according to the invention by using cyclic phenyl-containing siloxanes which are very readily miscible in organic compounds having reactive cyanate ester groups and after vulcanization with the crosslink design it ester matrix results in homogenous, transparent thermosets which exhibit no demixing, i.e. weeping or sweating of the siloxane component at the surface. Compared to the unmodified cyanate ester resins, the modified cyanate ester resins according to the invention after curing to afford the thermoset are characterized by reduced water absorption and thus greater resistance to hydrolytic decomposition and high thermooxidative stability, i.e. an only slightly higher mass loss during storage at high temperatures.

The invention provides crosslinkable compositions comprising (A) at least one organic compound free of siloxane units having at least two reactive cyanate ester groups (=“N≡CO—”), (B) at least one cyclosiloxane of general formula (I)

$$[R_aR^1_bSiO_{2/2}]_m, \quad (I)$$

wherein

R may be identical or different and represents monovalent, SiC-bonded, saturated aliphatic hydrocarbon radicals, $R^1$ may be identical or different and represents monovalent, SiC-bonded, optionally halogen- or phosphorus-substituted, aromatic hydrocarbon radicals, a is 0, 1 or 2, preferably 0 or 1, particularly preferably 0, b is 0, 1 or 2, preferably 1 or 2, particularly preferably 2, m is 3, 4 or 5, preferably 3 or 4, particularly preferably 4, with the proviso that a+b is 2 and at least three radicals $R^1$ are present per siloxane molecule (B).

In order not to result in an excessive number of pages of the description in the present application only the preferred embodiments for individual features are specified. However, the expert reader should explicitly understand this type of disclosure as meaning that every combination of different preference levels is also explicitly disclosed and explicitly desired—i.e. every combination both within a single compound and between different commands.

Compound (A)

This is an organic siloxane-free compound having at least two reactive cyanate ester groups (=“N≡CO—”) per molecule. (A) may be substituted and may also contain heteroatoms. Component (A) is preferably selected from optionally substituted, optionally heteroatom-containing aromatic hydrocarbon compounds, wherein at least two aromatic hydrocarbon-bonded cyanate ester groups are present per molecule. It is particularly preferable when component (A) comprises per molecule at least two optionally substituted, optionally heteroatom-containing aromatic hydrocarbon radicals, each having an aromatic carbon atom-bonded cyanate ester group, in particular in component (A) the optionally substituted, optionally heteroatom-containing aromatic hydrocarbon radicals, each having an aromatic carbon atom-bonded cyanate ester group independently of one another bonded to one another via a covalent bond or a bridging unit containing at least one functional group selected from $—CR^2_2—$, —O—, —S—, —N=N—, —CH=N—, —CO—, —C(O)O—, —SO—, $—SO_2—$, $OP(O—)_3$; a divalent aromatic group such as phenylene, biphenylene and naphthylene; or cycloalkylene groups, such as tricyclo[5.2.1.$0^{2,6}$]decanediyl and bicyclo[2.2.1]heptanediyl.

Radical $R^2$ is independently at each occurrence a hydrogen atom, a fluorine atom or an optionally substituted hydrocarbon radical having 1 to 30 carbon atoms which may optionally be joined to a cyclic unit either with a substituent or with the other radical $R^2$.

Examples of optionally substituted hydrocarbon radicals $R^2$ are methyl, ethyl, trifluormethyl, fluorenyl, 1,1-cyclohexanediyl, 9H-fluoren-9,9-diyl, N-phenylphtalimid-3,3-diyl, 1(3H)-isobenzofuranone-3,3-diyl, anthracen-9(101)-one-10,10-diyl, phenyl and 3,3,5-trimethylcyclohexan-1,1-diyl.

Examples of component (A) employed according to the invention are di- and polycyanate esters of monoaromatic hydrocarbons, such as phenylene-1,2-dicyanate, phenylene-1,3-dicyanate (CAS 1129-88-0), phenylene-1,4-dicyanate (CAS 1129-80-2), 2,4,5-trifluorophenylene-1,3-dicyanate, 1,3,5-tricyanatobenzene, methyl(2,4-dicyanatophenyl)ketone and 2,7-dicyanatonaphthalene; cyanate esters of bisphenols, such as 2,2-bis(4-cyanatophenyl)butane, 2,2-bis(4-cyanatophenyl)propane (CAS 1156-51-0, bisphenol A cyanate ester), 2,2-bis(4-cyanatophenyl)-1,1,1,3,3,3-hexafluoropropane (CAS 32728-27-1, Bisphenol AF cyanate ester), 2,2-bis(3-methyl-4-cyanatophenyl)propane (Bisphenol C cyanate ester), 1,1-bis(4-cyanatophenyl)ethane (CAS 47073-92-7, bisphenol E cyanate ester), 1,1-bis(4-cyanatophenyl)-1-phenylethane (bisphenol AP cyanate ester), bis(4-cyanatophenyl)methane (bisphenol F cyanate ester), bis(4-cyanato-3,5-dimethylphenyl)methane (CAS 101657-77-6, tetramethyl-bisphenol F cyanate ester), 1,3-bis(2-(4-cyanatophenyl)propan-2-yl)benzene (CAS 127667-44-1, bisphenol M cyanate ester), bis(4-cyanatophenyl)thioether), bis(4-cyanatophenyl)ether, 9,9-bis(4-cyanatophenyl) fluorene (bisphenol FL cyanate ester), bis(4-cyanatophenyl) sulfone (bisphenol S cyanate ester), bis(4-cyanatophenyl) ketone, bis(4-(4-cyanatophenoxy)phenyl)ketone, bis(4-(4-cyanatophenoxy)phenyl)sulfone, bis(4-(4-cyanatophenoxy) phenyl)(phenyl)phosphine oxide, bis(4-cyanatophenyl) (methyl)phosphine oxide, 1,1-dibromo-2,2-bis(4-cyanatophenyl)ethylene, 1,1-dichloro-2,2-bis(4-cyanatophenyl)ethylene (CAS 14868-03-2), 3,3-bis(4-cyanatophenyl)-N-phenylphthalimide, 3,3-bis(4-cyanatophenyl)-1(3H)-isobenzofuranone, 3,3-bis(4-cyanatophenyl)-2-benzofuran-1-one, 10,10-bis(4-cyanatophenyl)anthracene-9(101)-one, 1-ethyl-2-methyl-3-(4-cyanatophenyl)-5-cyanatoindane, 1,1-dimethyl-3-methyl-3-(4-cyanatophenyl)cyanatoindane, bis(2-cyanato-3-methoxy-5-methylphenyl)methane and 1,1-bis(3-methyl-4-cyanatophenyl)cyclohexane (bisphenol Z cyanate ester); cyanate esters of propenyl-substituted bisphenols, such as bis(4-(4-(2-(3-(2-propenyl)-4-cyanatophenyl)propan-2-yl) phenoxy)phenyl)sulfone, 2,2-bis(3-(2-propenyl)-4-cyanatophenyl)propane, 2,2-bis(3-(1-propenyl)-4-cyanatophenyl) propane, 2,2-bis(3-(2-propenyl)-4-cyanatophenyl)propane and bis(4-(4-cyanato-3-(2-propenyl)phenoxy)phenyl) sulfone; cyanate esters of biphenyl, such as 4,4'-dicyanatobiphenyl (CAS 1219-14-3), 2,4'-dicyanatobiphenyl and 2,2'-dicyanatobiphenyl; phenol dicyclopentadiene cyanate ester resins, such as CAS 135507-71-0 (trade name: AroCy® XU-71787); cyanate esters of phenol-, naphthol-, naphthalenediol- or cresol-formaldehyde condensation products, such as cresol-novolac cyanate ester or phenol-novolac cyanate ester, for example CAS 87397-54-4, CAS 153191-90-3, CAS 268734-03-8, CAS 30944-92-4 and CAS 173452-35-2 (examples of trade names are Primaset® PT-15, PT-30, PT-60, PT-90 and CT-90; and AroCy® XU-371); 1,1,1-tris(4-cyanatophenyl)ethane (CAS 113151-22-7); 1,6-dicyanatoperfluorohexane; cyanate esters of polyphenols; homopolymeric or copolymeric cyanate ester resins, such as bisphenol A dicyanate homopolymer (CAS 25722-66-1); cyanate esters of silanes having phenolic radicals, such as dimethylbis(4-cyanatophenyl)silane; and end-terminated cyanate ester polymer resins (A1) composed of at least two identical or different repeating units, wherein the backbone of each repeating unit contains at least one divalent aromatic group, such as phenylene, biphenylene and naphthylene; or 9H-fluorene-9,9-diyl, and at least one functional group selected from —O—, —S—, —SO—, $—SO_2—$, —CO—, —C(O)O—, $—CH_2—$, $—CF_2—$, —CHF—, $—C(CF_3)_2—$, $—C(CH_3)_2—$, $—CH(CH_3)—$, —N=N—, —CH=N—, $OP(O—)_3$; or cycloalkylene groups, such as tricyclo[5.2.1.$0^{2,6}$]decanediyl and bicyclo [2.2.1]heptanediyl. Examples of repeating units in (A1) are arylene ethers, arylene ether sulfones or arylene ether ketones. Mixtures of different components (A)/(A1) may also be employed.

Component (A) is preferably selected from 2,2-bis(4-cyanatophenyl)propane, 1,1-bis(4-cyanatophenyl)ethane, bis(4-cyanatophenyl)methane, 1,3-bis(2-(4-cyanatophenyl) propan-2-yl)benzene, 2,2-bis(3-(2-propenyl)-4-cyanatophenyl)propane, bis(4-cyanatophenyl)thioether, bis(4-cyanatophenyl)sulfone, phenol-dicyclopentadiene cyanate ester resins and cyanate esters of phenol- or cresol-formaldehyde condensation products. Component (A) is particularly preferably selected from 2,2-bis(4-cyanatophenyl)propane, bis(4-cyanatophenyl)methane, 1,1-bis(4-cyanatophenyl)ethane, 1,3-bis(2-(4-cyanatophenyl)propan-2-yl)benzene, bis(4-cyanatophenyl)thioether, bis(4-cyanatophenyl)sulfone, phenol dicyclopentadiene cyanate ester resins and cyanate esters of phenol- or cresol-formaldehyde condensation products.

It is possible to employ only one component (A) or a mixture of different components (A).

After curing, components (A) and (B) preferably form microscopically homogeneously transparent thermosets which exhibit no demixing, i.e. weeping or sweating of the siloxane component at the surface Compound (B)

(B) is a cyclosiloxane of general formula (I) as described hereinabove. Cyclosiloxane (B) may be solid or liquid at 23 °C and 1013 hPa, solid being preferred.

Cyclosiloxane (B) preferably has a melting point higher than 30 °C, preferably higher than 80 °C, particularly preferably higher than 130 °C, in particular higher than 150 °C, very particularly preferably higher than 180 °C, in each case at 1013 hPa.

Examples of monovalent, SiC-bonded, saturated aliphatic hydrocarbon radicals R are alkyl radicals, such as methyl, ethyl, n-propyl, isopropyl, 1-n-butyl, 2-n-butyl, isobutyl, tert-butyl, n-pentyl, isopentyl, neo-pentyl, tert-pentyl, n-hexyl, n-heptyl, n-octyl, 2,4,4-trimethylpentyl, 2,2,4-trimethylpentyl, 2-ethylhexyl, n-nonyl, n-decyl, n-dodecyl, n-hexadecyl, n-octadecyl; cycloalkyl radicals such as cyclopentyl, cyclohexyl, cycloheptyl and methylcyclohexyl.

Radical R is preferably selected from monovalent, SiC-bonded hydrocarbon radicals having 1 to 8 carbon atoms, particularly preferably methyl.

Examples of monovalent, SiC-bonded aromatic, optionally substituted hydrocarbon radicals $R^1$ are aryl radicals, such as phenyl, biphenyl, naphthyl, anthryl and phenanthryl; alkaryl radicals, such as o-, m-, p-tolyl; xylyl radicals and ethylphenyl radicals; aralkyl radicals, such as benzyl, (9,10-dihydro-9-oxa-10-phosphaphenanthrene-10-oxid-10-yl) ethyl, α- and β-phenylethyl; haloaryl radicals, such as fluorophenyl, chlorophenyl and bromophenyl.

Radical $R^1$ is preferably selected from halogen-and phosphorus-free aromatic hydrocarbon radicals, particularly preferably phenyl.

Component (B) is preferably selected from cyclosiloxanes of formula (I) where m is 3 or 4, a is 1 and b is 1. Component (B) is particularly preferably selected from cyclosiloxanes of formula (I) where m is 3 or 4, wherein in at least one of the m units a is 0 and b is 2. Component (B) is especially selected from cyclosiloxanes of formula (I) where m is 4, a is 0 and b is 2.

Examples of the cyclosiloxanes (B) employed according to the invention are octaphenylcyclotetrasiloxane (CAS 546-56-5), hexaphenylcyclotrisiloxane (CAS 512-63-0), 2,4,6,8-tetramethyl-2,4,6,8-tetraphenylcyclotetrasiloxane (CAS 77-63-4), 2,4,6-trimethyl-2,4,6-triphenylcyclotrisiloxane (CAS 546-45-2), 1,1,3,3,5,5-hexaphenyl-7,7-dimethylcyclotetrasiloxane (CAS 1693-46-5) and 1,1,3,3-tetramethyl-5,5,7,7-tetraphenylcyclotetrasiloxane (CAS 1693-47-6), wherein octaphenylcyclotetrasiloxane and hexaphenylcyclotrisiloxane are particularly preferred.

It is possible to employ only one component (B) or a mixture of different components (B).

The compositions according to the invention contain cycle siloxane (B) in amounts of preferably 1 to 100 parts by weight, particularly preferably 5 to 50 parts by weight, in particular 5 to 25 parts by weight, in each case based on 100 parts by weight of component (A).

In addition to components (A) and (B) the compositions according to the invention may contain further substances distinct from components (A) and (B), for example modifier (C), reactive resin (D), filler (E), accelerator (F), solvent (G) and further constituents (H).

Compound (C)

The modifiers (C) are selected from organopolysiloxanes (C1) containing units of formula (II)

$$R^3_m(OR^4)_nSiO_{(4-m-n)/2}, \quad (II)$$

wherein $R^3$ may be identical or different at each occurrence and represents hydrogen or monovalent or divalent, SiC-bonded, optionally substituted, for example heteroatom-substituted, hydrocarbon radicals, $R^4$ may be identical or different at each occurrence and represents hydrogen or monovalent, optionally substituted hydrocarbyl radicals having 1 to 18 carbon atoms, m is 0, 1, 2 or 3, preferably 1, 2 or 3, n is 0, 1, 2 or 3, preferably 0, 1 or 2, particularly preferably 0 or 1, in particular 0, and with the proviso that in formula (II) the sum m+n is ≤3, in not more than 20%, preferably not more than 15%, particularly preferably not more than 10%, in particular not more than 5%, of the units of the formula (II) m=0; in not more than 1.0%, preferably not more than 0.5%, particularly preferably not more than 0.3%, in particular not more than 0.2%, of the units of formula (II) $R^4$ is hydrogen, in each case based on all siloxane units of formula (II) in organopolysiloxane (C1); and that cyclic siloxanes of formula (II) where m=2 and n=0 contain at least one unit of formula (II) where $R^3$ is a reactive, halogen-and phosphorus-free functional radical.

Examples of monovalent or divalent, SiC-bonded, optionally substituted hydrocarbon radicals $R^3$ are phenylene and biphenylene, the radicals recited for R and $R^1$; reactive functional radicals, such as monovalent hydrocarbon radicals having aliphatic carbon-carbon multiple bonds, such as vinyl, 1-propenyl, 2-propenyl, vinylcyclohexyl, norbornenyl, norbornenylethyl, bicyclo[2.2.1]hept-5-en-2-yl, dicyclopentenyl, cyclohexenyl, 4-vinylphenyl, styryl, arylethynyl, ethynylphenyl, 1-propenylphenyl and 2-propenylphenyl; imido radicals, such as N-(5-ethynylphthalimido)phenyl, N-(5-(phenylethynyl)phthalimido) phenyl, nadimidophenyl, maleimidophenyl and 3-maleimidopropyl; epoxy radicals, such as 3-glycidoxypropyl, 4-(oxiran-2-yl)phenyl, oxiran-2-yl and 2-(3,4-epoxycyclohexyl)ethyl; acrylate and methacrylate radicals, such as 3-methacryloxypropyl, acryloxymethyl and methacryloxymethyl; amine radicals, such as aminophenyl, 3-aminopropyl, N-(2-aminoethyl)-3-aminopropyl and N-phenylaminomethyl; hydroxyalkyl and hydroxyaryl radicals, such as hydroxypropyl and hydroxyphenyl; and bicyclo[4.2.0]octa-1,3,5-trienyl(benzocyclobutenyl), cyanatophenyl, isocyanatophenyl and 3-isocyanatopropyl.

Radical $R^3$ is preferably selected from hydrogen or phenylene, phenyl, methyl, hydroxyphenyl, maleimidophenyl, cyanatophenyl and aminophenyl, particularly preferably from methyl, phenyl and hydroxyphenyl.

Radical $R^4$ is preferably selected from methyl, ethyl, n-propyl, isopropyl, n-butyl, sec-butyl, tert-butyl or isobutyl, particularly preferably methyl or ethyl.

Examples of organopolysiloxanes (C1) are 1,3,5,7-tetrakis(2-(3,4-epoxycyclohexyl)ethyl)-1,3,5,7-tetramethylcyclotetrasiloxane (CAS 121225-98-7), bis[2-(3,4-epoxycyclohex-1-yl)ethyl]-1,1,3,3-tetramethyldisiloxane (CAS 18724-32-8), 1,3-bis(norbornenylethyl)-1,1,3,3-tetramethyldisiloxane, 2,4,6,8-tetramethyl-2,4,6,8-tetrakis[3-(glycidoxy)propyl]cyclotetrasiloxane (CAS 257284-60-9), an organopolysiloxane having the average composition $(PhSiO_{3/2})_2O(PhSi(OMe)O_{2/2})_{66}(PhSi(OMe)_2O_{1/2})_{14}$ and a weight-average molar mass Mw=2190 g/mol, octa(epoxycyclohexyl)-POSS (CAS 187333-74-0), octaphenyl-POSS (CAS 5256-79-1) and 1,1,3,5,5-pentaphenyl-1,2,3-trimethyltrisiloxane (CAS 3390-61-2).

The modifiers (C) may further be selected from cyanate ester-free thermoplastic organic polymers (C2). The thermoplastics (C2) have either reactive end groups or chemically inert end groups. Reactive end groups remain for example as a consequence of manufacture in the polymerization reaction from the corresponding reactive groups of the monomers. The groups are preferably hydroxyl, amino, carboxyl and isocyanato groups. Examples of chemically inert end groups are methyl or phenyl groups. The thermoplastics (C2) have glass transition temperatures above 100 °C, preferably of 130 °C to 450 °C, particularly preferably of 150 °C to 400 °C, in particular of 180 °C to 350 °C; the number average molar mass Mn of (C2) is preferably from 1000 to 100 000 g/mol, preferably from 2000 to 50 000 g/mol, particularly preferably from 2000 to 30 000 g/mol, in particular from 3000 to 20 000 g/mol. Examples of (C2) are polyarylenes, polyarylene ethers, polyarylene sulfides, polysulfones, polyethersulfones, polyetherketones, polyetheretherketones, polyetherketoneketones, polyetheretherketoneketones, polyimides, polybenzimidazoles, polyamides, poly(amideimides), polyarylates, polyesterimides, polyetherimides, polyaramids, polyacrylates, polyhydantoins, liquid-crystal polymers, polycarbonates, polyestercarbonates and polyethylene terephthalates; and also mixtures or copolymeric compounds thereof.

The modifiers (C) may further be selected from monofunctional cyanate esters (C3) of general formula (III)

$$R^4—OCN \quad (III),$$

wherein $R^4$ represents a monovalent, optionally substituted (for example also heteroatom-substituted) aromatic hydrocarbon radical with the proviso that the cyanate ester group is directly bonded to an aromatic carbon atom. Examples of suitable components (C3) are cyanatobenzene (CAS 1122-85-6), 1-cyanato-4-cumylbenzene (CAS 110215-65-1), 1-cyanato-4-tert-butylbenzene, 1-cyanato-2-tert-butylbenzene, 4-cyanatobiphenyl, 1-cyanatonaphthalene, 2-cyanatonaphthalene, 4-cyanatononylbenzene, 4-chlorocyanatobenzene, 4-cyanatodiphenylsulfone, 4-cyanatotoluene, 4-cyanatodiphenyl ether, 4-cyanatodiphenylketone, 4-(cyanato)methoxybenzene; and propenyl-substituted monofunctional cyanate esters, such as 2-(2-propenyl)cyanatobenzene.

The modifiers (C3) preferably have a boiling point at 1013 hPa of at least 150 °C, particularly preferably at least 180 °C, in particular at least 220 °C.

The modifiers (C) may further be selected from hydroxyl- and optionally propenyl-functionalized organic compounds (C4) which contain no further reactive functional groups suitable for the polymerization reaction.

In modifier (C4) the hydroxyl groups and any propenyl groups present are preferably directly bonded to aromatic carbon atoms.

Examples of modifiers (C4) without propenyl groups are tricyclodecanedimethanol (CAS 26896-48-0), monohydric, optionally substituted phenols, such as phenol, cresol, naphthol, thymol, 4-cumylphenol, 4-benzylphenol, 4-isopropylphenol, 2,4-bis(α,α-dimethylbenzyl)phenol, 2,4-di-tert-butyl phenol, nonyl phenol, xylenol or 2,6-dinonyl phenol; polyhydric, optionally substituted phenols, such as dihydroxybenzene, trihydroxybenzene and dihydroxynaphthalene; aromatic compounds having two (bisphenols) or more hydroxyphenyl groups, such as bis(2-hydroxyphenyl)methane, 2,2-bis(3-methyl-4-hydroxyphenyl)propane (bisphenol C), 1,1-bis(4-hydroxyphenyl)ethane (bisphenol E), 2,2-bis(4-hydroxyphenyl)propane (bisphenol A), 2,2-bis(4-hydroxyphenyl)hexafluoropropane (bisphenol AF), 9,9-bis(4-hydroxyphenyl)fluorene (bisphenol FL), bis(4-hydroxyphenyl)sulfone (bisphenol S), 1,3-bis(2-(4-hydroxyphenyl)-2-propyl)benzene (bisphenol M), bis(4-hydroxyphenyl)methane (bisphenol F), bis(4-hydroxyphenyl) ether, bis(4-hydroxyphenyl) thioether and 1,1,1-tris(4-hydroxyphenyl)ethane.

Examples of modifiers (C4) with propenyl groups are 2,2-bis(3-(2-propenyl)-4-hydroxyphenyl)propane (CAS 1745-89-7), 2-(2-propenyl)phenol (CAS 1745-81-9), 5,5'-bis(2-propenyl)-2,2'-biphenyldiol (CAS 528-43-8), 3',5-bis(2-propenyl)-2,4'-biphenyldiol (CAS 35354-74-6), α,α'-bis(3-(2-propenyl)-4-hydroxyphenyl)-p-diisopropylbenzene, 2,2'-bis(3-(2-propenyl)-4-hydroxyphenyl)perfluoropropane, 9,9'-bis(3-(2-propenyl)-4-hydroxyphenyl)fluorene, α,α'-bis(3-(1-propenyl)-4-hydroxyphenyl)-p-diisopropylbenzene, 2,2'-bis(3-(1-propenyl)-4-hydroxyphenyl)perfluoropropane, 9,9'-bis(3-(1-propenyl)-4-hydroxyphenyl)fluorene and bis(3-(2-propenyl)-4-hydroxyphenyl)sulfone (CAS 41481-66-7).

If the compositions according to the invention contain modifier (C) it is possible to employ only one modifier (C) or two or more different modifiers (C).

If the compositions according to the invention contain modifier (C1), (C2) and (C3), amounts of preferably 1 to 40 parts by weight, particularly preferably 1 to 30 parts by weight, in particular 1 to 20 parts by weight, are employed in each case based on 100 parts by weight of the mixture of components (A) and (B).

If the compositions according to the invention contain modifier (C4), the molar ratio of the sum of the cyanate ester groups present in the composition according to the invention to the sum of the reactive functional hydroxide groups in component (C4) is preferably in the range from 60:40 to 99:1, particularly preferably from 70:30 to 95:5.

Compound (D)

Reactive resins (D) are cyanate ester- and siloxane-free organic compounds selected from the group consisting of epoxides (D1) and imides (D2), with the proviso that imides (D2) comprise per molecule at least two, preferably at least two, optionally substituted, polymerizable 5-ethynylphthalimido, 5-(phenylethynyl)phthalimido, nadimido, benzocyclobutenephthalimido or maleimido groups which may optionally contain heteroatoms and are bonded to aromatic carbon atoms.

and epoxides (D1) comprise per molecule at least two, preferably at least two, optionally substituted glycidyloxy, glycidyloxycarbonyl, glycidylamino, diglycidylamino or oxiranyl groups which may optionally contain heteroatoms and are bonded to aromatic carbon atoms; wherein the maleimido, glycidyloxy, glycidylamino and diglycidylamino groups are particularly preferred.

It is preferable when the polymerizable reactive resins (D) preferably contain per molecule at least two optionally substituted, for example heteroatom-substituted, aromatic hydrocarbon radicals, each having a maleimido, glycidyloxy, glycidyloxycarbonyl, glycidylamino or diglycidylamino group bonded to an aromatic carbon atom. It is particularly preferable when (D) is selected from compounds having at least two optionally substituted, for example heteroatom-substituted, aromatic hydrocarbon radicals, each having a maleimido, glycidyloxy, glycidylamino or diglycidylamino group bonded to an aromatic carbon atom, wherein the optionally substituted, for example heteroatom-substituted, aromatic hydrocarbon radicals are bonded to one another via a covalent bond or a bridging unit containing at least one functional group selected from $—CR^5_2—$, —O—, —S—, —N═N—, —CH═N—, —CO—, —C(O)O—, $—S(O)_2—$, $OP(O—)_3$, phenylene, arylene, biphenylene, biarylene, naphthylene or cycloalkylene groups, such as tricyclo[5.2.1.$0^{2,6}$]decanediyl or bicyclo[2.2.1]heptanediyl.

Radical $R^5$ is independently at each occurrence a hydrogen atom, a fluorine atom or an optionally substituted hydrocarbon radical having 1 to 30 carbon atoms which may optionally be joined to a cyclic unit either with a substituent or with the other radical $R^5$.

Compound (D) preferably has no heteroatom-containing aromatic hydrocarbon radicals.

Epoxy resins (D1) are preferably copolymerizable with component (A).

Imide resins (D2) are preferably not copolymerizable with component (A).

Examples of epoxy resins (D1) are glycidyl ethers of phenolic compounds, such as 2,2-bis(4-glycidyloxyphenyl)propane (CAS 1675-54-3), bis(4-glycidyloxyphenyl)methane (CAS 2095-03-6), 1,2-bis(glycidyloxy)benzene (CAS 2851-82-3), 1,3-bis(glycidyloxy)benzene (CAS 101-90-6), 1,4-bis(glycidyloxy)benzene (CAS 129375-41-3), 3,5,3',5'-tetramethyl-4,4'-diglycidyloxybiphenyl (CAS 85954-11-6), 2,2-bis(3,5-dibromo-4-glycidyloxyphenyl)propane (CAS 3072-84-2), tris(4-glycidyloxyphenyl)methane (CAS 66072-38-6), 1,1,2,2-tetrakis(4-glycidyloxyphenyl)ethane (CAS 7328-97-4), 4,4'-bis(glycidyloxyphenyl)sulfone (CAS 878-43-1), 9,9-bis(4-glycidyloxyphenyl)fluorene (CAS 47758-37-2), 1,6-(diglycidyloxy)naphthalene (CAS 27610-48-6); glycidyl ethers of phenol, naphthol, naphthalenediol, bisphenol or cresol-formaldehyde condensation products, such as cresol-novolac glycidyl ether (CAS 29690-82-2), phenol-novolac glycidyl ether (CAS 9003-36-5, CAS 28064-14-4, CAS 158163-01-0) and bisphenol A-epichlorohydrin-formaldehyde copolymer (CAS 28906-96-9); glycidyl ethers of phenol- or cresol-dicyclopentadiene condensation products, such as CAS 68610-51-5 and CAS 119345-05-0; glycidyl esters of aromatic carboxylic acids, such as diglycidyl phthalate (CAS 7195-45-1), diglycidyl terephthalate (CAS 7195-44-0), diglycidyl isophthalate (CAS 7195-43-9), triglycidyl 1,2,3-benzenetricarboxylate, triglycidyl 1,2,4-benzenetricarboxylate (CAS 7237-83-4) and triglycidyl 1,3,5-benzenetricarboxylate (CAS 7176-19-4); glycidyl derivatives of aromatic amines and aminophenols, such as N,N-diglycidyl-4-glycidyloxyaniline (CAS 5026-74-4), 4,4'-methylenebis(N,N-diglycidylaniline) (CAS 28768-32-3), N, N,N',N'-tetraglycidyl-4,4'-diamino-3,3'-diethyldiphenylmethane (CAS 130728-76-6) and m-(glycidyloxy)-N,N-diglycidylaniline (CAS 71604-74-5); glycidyl end-terminated thermoplastic polymers producible for example by reaction of amino- or hydroxy-terminated thermoplastics (C2) with epichlorohydrin, such as glycidyloxy- or diglycidylamino-end-terminated polysulfones; homopolymeric or copolymeric epoxy resins, such as bisphenol A epichlorohydrin copolymer (CAS 25036-25-3), 2,2',6,6'-tetrabromobisphenol A-epichlorohydrin copolymer (CAS 40039-93-8) and reaction products of diglycidylbisphenol A with m-phenylenebis(methylamine) (CAS 110839-13-9); and mixtures of different epoxy resins (D1).

Examples of polymerizable maleimide resins (D2) are N-(4-hydroxyphenyl)maleimide (CAS 7300-91-6), 4,4'-bis(maleimidophenyl)methane (CAS 13676-54-5), bis(4-maleimido-3-methylphenyl)methane, bis(4-maleimido-3,5-dimethylphenyl)methane, 1,1-bis(4-maleimidophenyl)cyclohexane, 2,4-bismaleimidotoluene (CAS 6422-83-9), N,N'-1,2-phenylenebismaleimide (CAS 13118-04-2), N,N'-1,3-phenylenebismaleimide (CAS 3006-93-7), N,N'-1,3-phenylenebismaleimide (CAS 3278-31-7), copolymers of bismaleimides and aromatic amine, such as 4,4'-bis(maleimidophenyl)methane/4,4'-bis(aminophenyl)methane copolymer (CAS 26140-67-0); bis(4-maleimidophenyl)ether, 2,2-bis[4-(maleimidophenoxy)phenyl]propane (CAS 79922-55-7), bis(4-maleimidophenyl)sulfone (CAS 13102-25-5), bis(4-maleimidophenyl)ketone, 1,1'-(benzene-1,3-diyldimethanediyl)bis(1H-pyrrole-2,5-dione) (CAS 13676-53-4), 4,4'-bis(maleimido)-1,1'-biphenyl (CAS 3278-30-6), 4,4'-bis(3-maleimidophenoxy)diphenylsulfone or maleimide-terminated thermoplastic polymers (D2) produced for example by reaction of amino-terminated thermoplastics (C2) with maleic anhydride, such as maleimide-terminated polysulfone ethers; and mixtures of different maleimide resins (D2).

If the compositions according to the invention contain polymerizable reactor resins (D), the molar ratio of the sum of the cyanate ester groups present in the composition according to the invention to the sum of the reactive functional epoxide or imide groups in component (D) is preferably in the range from 20:80 to 99:1, particularly preferably from 40:70 to 95:5, in particular from 60:40 to 90:10.

If the compositions according to the invention contain polymerizable imide resins (D2), it is preferable to add a further component which is copolymerizable both with cyanate ester groups and with imido groups, preferably maleimido groups. This may be selected from cyanate esters (A), modifiers (C3) or modifiers (C4) having propenyl groups bonded to aromatic carbon atoms.

If the compositions according to the invention contain polymerizable imide resin (D2), the molar ratio of the sum of the imide groups to the sum of the propenyl groups from (A), (C3) and (C4) is in a range from preferably 50:50 to 95:5, particularly preferably 60:40 to 90:10, in particular 70:30 to 80:20.

Compound (E)

The fillers (E) employed in the compositions according to the invention may be any known fillers.

The fillers (E) employed according to the invention are preferably those which exhibit less than 1% by weight in toluene at 23 °C and 1000 hPa.

Examples of fillers (E) are non-reinforcing particulate fillers, i.e. fillers having a BET surface area of preferably up to 50 $m^2/g$, for example quartz, glass, cristobalite, diatomaceous earth; water-insoluble silicates, such as calcium silicate, calcium metasilicate, magnesium silicate, zirconium silicate, talc, mica, feldspar, kaolin, zeolites; metal oxides, such as aluminum, titanium, iron, boron or zinc oxides or mixed oxides thereof; barium sulfate, calcium carbonate, marble flour, gypsum, silicon nitride, silicon carbide, boron nitride, plastic powders such as polyacrylonitrile or polyetherimide powder; reinforcing fillers, i.e. fillers having a BET surface area of more than 50 $m^2/g$, such as pyrogenic silica, precipitated silica, precipitated chalk, carbon black, such as furnace and acetylene black and silicon-aluminum mixed oxides having a large BET surface area; aluminum trihydroxide, magnesium hydroxide, hollow spherical fillers, such as glass microballoons, glass spheres, phenolic thermospheres or ceramic microspheres, for example those obtainable under the trade name Zeeospheres™ from 3M Deutschland GmbH, Neuss, Germany; fibrous fillers, such as wollastonite, montmorillonite, basalt, bentonite and chopped and/or ground glass fibers (short glass fibres) or mineral wool; metallic fibres, fibers composed of metal oxides, glass, ceramics, carbon or plastic; and natural fibers composed of cellulose, flax, hemp, wood or sisal.

To produce high-performance composite materials the resin compositions according to the invention preferably contain fiber reinforcement (E1) made of any known fiber-forming materials, preferably from polypropylene, polyethylene, polytetrafluoroethylene, polyester; metallic fibers made of steel; oxidic and non-oxidic ceramics, such as silicon carbide, aluminum oxide, silicon dioxide, boron oxide; glass, quartz, carbon, aramid, asbestos, graphite, acrylonitrile, poly(benzothiazole), poly(benzimidazole), poly(benzoxazole), titanium dioxide, boron and aromatic polyamide fibers, such as poly(p-phenylene terephthalamide). The fibers (E1) may be employed in the form different forms, for example as continuous ropes, each having 1000 to 400 000 individual filaments, woven fabrics, noncrimp fabrics, knitted fabrics, braids, mats, nonwovens, whiskers, chopped or ground short fibers or random fiber felt. Preferred fibers are carbon fibers, aromatic polyamide fibers, ceramic and glass fibers.

The recited fillers may optionally be surface-treated, for example hydrophobized, for example by treatment with organosilanes or organosiloxanes, stearic acid or with one or more modifiers (C). The fillers (E) are preferably surface-treated.

The fillers (E) employed according to the invention may be employed either individually or in any mixture with one another. If a mixture of different fillers (E) is employed it is preferably selected from fillers (E1).

If the composition according to the invention contains fillers (E) the proportion of component (E) based on the uncured composite material is preferably 5% to 80% by weight, particularly preferably 10% to 70% by weight, in particular 15% to 60% by weight. Said fillers are preferably fibrous fillers (E1).

If the composition according to the invention contains both fiber reinforcement (E1) and non-fibrous fillers (E), the weight ratio of the components (E):(E1) is preferably not more than 50%.

Compound (F)

The composition according to the invention may be crosslinked in the presence of an accelerator (F1), such as is known from the prior art. Suitable curing accelerators (F1) are for example acids and bases, such as hydrochloric acid, phosphoric acid, aliphatic and aromatic amines, such as triethylamine, N,N-dimethylaniline and pyridine; amidines, guanidines, sodium hydroxide, phosphines; halides, such as aluminum chloride, lithium chloride, boron fluoride, iron chloride, zinc chloride, zinc fluoride, tin chloride, cobalt chloride and titanium chloride; and organometallic compounds, such as metal alkoxides, metal carboxylates or metal-chelate complexes of aluminum, copper, zinc, titanium, iron, manganese, cobalt, chromium or nickel. Examples of organometallic compounds are cobalt(II) naphthenate, nickel(II) naphthenate, iron(III) naphthenate, copper(II) naphthenate, manganese(II) naphthenate, aluminum (III) naphthenate, zinc(II) naphthenate, zinc(II) octoate, zinc (II) acetylacetonate, iron(III) acetylacetonate, cobalt(II) acetylacetonate, chromium(III) acetylacetonate, aluminum (III) acetylacetonate and copper(II) acetylacetonate.

If an accelerator (F1) is employed for crosslinking the compositions according to the invention this is preferably a combination of an organometallic compound and a co-accelerator having at least one active proton, particularly preferably a combination on organometallic compound and a phenol (C4), for example nonylphenol.

If the compositions according to the invention contain accelerators (F1), the amounts involved are preferably 0.00001 to 5 parts by weight based on 100 parts by weight of component (A), wherein organometallic compounds (F1) are particularly preferably employed in amounts of 0.0001 to 0.02 parts by weight based on 100 parts by weight of component (A).

If the compositions according to the invention contain imide-containing modifier (C1) or imide resin (D2), it is possible to employ radical-forming accelerators (F2), such as organic peroxides, for example dicumyl peroxide, di-tert-butyl peroxide, dibenzoyl peroxide, dilauroyl peroxide, 1,1-bis(tert-butylperoxy)cyclohexane and tert-butyl perbenzoate; or azo compounds, such as azobis(isobutyronitrile); as curing accelerators either alone or in addition to (F1). If the compositions according to the invention contain free radical-forming accelerators (F2), the amounts involved are preferably 0.1 to 2 parts by weight based on 100 parts by weight of the sum of imide-containing modifier (C1) and imide resin (D2). It is preferable not to employ free radical-forming accelerator (F2).

Compound (G)

Examples of optionally employed solvent (G) are monohydric and polyhydric alcohols, such as methanol, ethanol, n-propanol, isopropanol, n-butanol, isobutanol, sec-butanol, 1,2-ethanediol, 1,2-propanediol, 1,3-propanediol, polypropylene glycol, polyethylene glycol, 1,2-butanediol, 1,3-butanediol, polybutylene glycol and glycerol; ethers, such as methyl tert-butyl ether, di-tert-butyl ether and di-, tri- or tetraethylene glycol dimethyl ether; saturated hydrocarbons, such as n-hexane, cyclohexane, n-heptane, n-octane and isomeric octanes, such as 2-ethylhexane, 2,4,4-trimethylpentane, 2,2,4-trimethylpentane, 2-methylheptane and trichlorethylene, and mixtures of saturated hydrocarbons having boiling ranges between 60-300 °C, as available under the trade names Exxsol™, Hydroseal® or Shellsol®; aromatic solvents, such as benzene, toluene, styrene, o-, m- or p-xylene, solvent naphtha, dimethyl phthalate, diisobutyl phthalate, dicyclohexyl phthalate, mesitylene and chlorobenzene; aldehyde acetals, such as methylal, ethylhexylal, butylal, 1,3-dioxolane and glycerol formal; carbonates, such as 1,3-dioxolan-2-one, diethyl carbonate, dimethyl carbonate, dipropyl carbonate, propylene glycol carbonate, ethylene carbonate; ketones, such as acetone, methyl isobutyl ketone, methyl ethyl ketone, methyl isoamyl ketone, diisobutyl ketone, acetone and cyclohexanone; esters, such as ethyl acetate, n-butyl acetate, ethylene glycol diacetate, gamma-butyrolactone, 2-methoxypropyl acetate (MPA), dipropylene glycol dibenzoate and ethyl ethoxypropionate; amidesv such as N,N-dimethylformamide, N,N-dimethylacetamide, N-methyl-2-pyrrolidone and N-ethyl-2-pyrrolidone; acetonitrile; and dimethyl sulfoxide.

Preferred solvents (G) are aromatic hydrocarbons and ketones.

If the compositions according to the invention contain solvent (G), the amount involved are preferably 10 to 500 parts by weight, particularly preferably 50 to 300 parts by weight, in each case based on 100 parts by weight of the sum of the components (A) and (B). The compositions according to the invention preferably contain no solvent (G).

Compound (H)

Component (H) optionally employed according to the invention is preferably selected from pigments, dyes, fragrances, processing aids, such as agents for influencing tack, lubricants, demolding agents, antiblocking agents, dispersants; stabilizers against hydrolysis, light, oxidation, heat, discoloration; flame retardants or plasticizers.

If the compositions according to the invention contain further constituents (H), the amounts involved are preferably from 0.01 to 20 parts by weight, particularly preferably 0.1 to 10 parts by weight, in each based on 100 parts by weight of the sum of components (A) and (B). The compositions according to the invention preferably contain no further constituents (H).

The compositions according to the invention are by preference those containing (A) at least one cyanate ester resin,
(B) at least one cyclosiloxane,
optionally (C) at least one modifier,
optionally (D) at least one reactive resin,
(E) at least one filler,
optionally (F) at least one accelerator,
optionally (G) at least one solvent and
optionally (H) further components.

The compositions according to the invention are preferably those containing (A) at least one cyanate ester resin,
(B) at least one cyclosiloxane,
(C) at least one modifier,
optionally (D) at least one reactive resin,
(E1) at least one fiber-reinforcing filler,
optionally (F) at least one accelerator,
optionally (G) at least one solvent and
optionally (H) further components.

In a particularly preferred embodiment the compositions according to the invention are those containing (A) at least one cyanate ester resin,
(B) at least one cyclosiloxane,
optionally (C) at least one modifier,
(D1) at least one epoxy resin,
(E1) at least one fiber-reinforcing filler,
optionally (F) at least one accelerator,
optionally (G) at least one solvent and
optionally (H) further components.

The compositions according to the invention are in particular those containing (A) at least one cyanate ester resin,
(B) at least one cyclosiloxane,
(C) at least one modifier,
(D1) at least one epoxy resin,
(E1) at least one fiber-reinforcing filler,
optionally (F) at least one accelerator,
optionally (G) at least one solvent and
optionally (H) further components.

In a further particularly preferred embodiment the compositions according to the invention are those containing (A) at least one cyanate ester resin,
(B) at least one cyclosiloxane,
optionally (C) a modifier selected from the group (C1) to (C4),
(D2) at least one maleimide resin,
(E1) at least one fiber-reinforcing filler,
optionally (F) at least one accelerator,
optionally (G) at least one solvent and
optionally (H) further components,
with the proviso that at least one component (A), (C3) or (C4) having propenyl groups directly bonded to aromatic carbon atoms is present.

The compositions according to the invention are in particular those containing (A) at least one cyanate ester resin,
(B) at least one cyclosiloxane,
optionally (C) at least one modifier selected from the group (C1) to (C4),
(C) at least one further modifier distinct from (C4),
(D) at least one polymerizable maleimide resin,
(E1) at least one fiber-reinforcing filler,
optionally (F) at least one accelerator,
optionally (G) at least one solvent and
optionally (H) further components,
with the proviso that at least one component (A), (C3) or (C4) having propenyl groups directly bonded to aromatic carbon atoms is present.

The compositions according to the invention contain no further components in addition to components (A), (B), the optionally employed components (C) to (H) and possibly raw material-typical impurities, for example residual catalyst, such as sodium chloride or potassium chloride; and impurities in technical grade cyanate ester resin monomers and possibly reaction products of the employed components formed during the mixing/during storage.

In the compositions according to the invention the above-described components may each be employed individually or in the form of a mixture of at least two of the respective components.

Production of the compositions according to the invention may be carried out according to known processes, for example by mixing the individual components in any desired sequence and in known fashion.

The present invention further provides a process for producing the compositions according to the invention by mixing the individual components in any desired sequence.

In the process according to the invention the mixing may be carried out at temperatures in the range from preferably 20 °C to 150 °C, particularly preferably in the range from 50 °C to 130 °C, in particular at temperatures of 60 °C to 120 °C. It is very particularly preferable to perform the mixing at the temperature that results during mixing at a temperature from the temperature of the raw materials plus the temperature increase due to the energy input during mixing, wherein the mixture may be heated or cooled as required.

The mixing may be carried out at the pressure of the ambient atmosphere, i.e. about 900 to 1100 hPa. The mixing may further be carried out intermittently or permanently under reduced pressure, for example at 30 to 500 hPa absolute pressure, to remove volatile compounds and/or air or at positive pressure, such as at pressures between 1100 hPa and 3000 hPa absolute pressure, especially in a continuous process mode, when these pressures are established for example in closed systems as a result of pressure during pumping and as a result of the vapor pressure of the employed materials at elevated temperatures.

The process according to the invention may be performed continuously, discontinuously or semicontinuously, preferably discontinuously.

In a preferred embodiment of the process according to the invention for producing compositions the individual components are mixed in any desired sequence, wherein the filler (F) employed is component (F1).

The compositions according to the invention may be employed for any purposes which have previously employed prepolymers of thermosets.

The compositions according to the invention may be made into shaped articles by known processing techniques, for example by prepregging (from the melt, solution or suspension), resin transfer molding, filament winding, compression molding, powder coating and pultrusion.

In one variant of the process according to the invention components (A) and (B) and the optional components (C), (D), (G) and (H) are preferably initially mixed in any desired sequence to afford a premixture and then component (E1), preferably ropes, woven fabrics, noncrimp fabrics, knitted fabrics or braids, is impregnated with the premixture optionally under pressure and optionally degassed. In the case of multilayer woven fabrics or noncrimp fabrics (E1) impregnation and degassing may be performed on each layer individually or all layers together.

In a further preferred variant of the process according to the invention components (A) and (B) and the optional components (C), (D), (G) and (H) are initially mixed in any desired sequence to afford a premixture and then injected into a mold cavity containing the component (E1), preferably ropes, woven fabrics, noncrimp fabrics, knitted fabrics or braids, wherein degassing is preferably carried out simultaneously with the injection.

In a further preferred variant of the process according to the invention components (A) and (B) and the optional components (C), (D), (G) and (H) are initially mixed in any desired sequence to afford a premixture then applied to a release paper; subsequently component (E1), preferably oriented ropes, woven fabrics, noncrimp fabrics, knitted fabrics or braids, are pressed between two coated paper sheets and passed through a series of heated rollers to ensure complete wetting of component (E1).

The compositions according to the invention may be brought into any desired shape through mechanical pressure at ambient temperature or optionally at elevated temperature.

The compositions according to the invention are preferably shapable and are particularly preferably fashioned in a mold cavity/around a shaped article and cured.

The present invention therefore further provides a process for producing shaped articles by shaping the composition and curing.

The present invention therefore further provides for the use of the composition according to the invention for producing shaped articles.

The invention therefore further provides shaped articles obtainable from the compositions according to the invention by shaping and curing.

The compositions according to the invention/produced according to the invention undergo crosslinking by cyclotrimerization of the cyanate ester groups from (A), optionally (C1) and optionally (C3) to afford 1,3,5-triazine units, optionally in the presence of an accelerator (F1); and optionally also by cyclotrimerization and cyclotetramerization of carbon-carbon triple bonds, addition reaction, Alder-ene reaction, Diels-Alder cycloaddition and polymerization, wherein intramolecular rearrangements, isomerizations and rearomatization steps may also occur. If the curing according to the invention additionally proceeds by addition reaction and optionally rearrangement any epoxy groups from (C1) and (D1) and the cyanate ester groups cyclized into triazine units from (A) preferably react with one another and/or any hydroxide groups from (C1), (C2) and (C4) preferably react with the cyanate ester groups from (A). If the curing according to the invention additionally proceeds by cyclotrimerization and cyclotetramerization of carbon-carbon triple bonds any reactive carbon-carbon triple bonds of imide resin (D2) and/or modifier (C1) preferably react with one another. If the curing according to the invention additionally proceeds by polymerization any reactive nadimido or maleimido groups or the carbon-carbon triple bonds of imide resin (D2) and/or modifier (C1) preferably react with one another, wherein the polymerization may possibly be followed by rearrangements and possibly cycloadditions. If the curing according to the invention additionally proceeds by an Alder-ene or Diels-Alder reaction, any reactive groups from imide resin (D2), particularly preferably maleimide resin (D2), and any propenyl groups from (A), (C1), (C3) and/or (C4) preferably react with one another, wherein further Diels-Alder reactions and rearomatization steps particularly preferably follow.

The mixtures according to the invention/produced according to the invention are preferably degassed before curing, particularly preferably after shaping and before curing.

The crosslinking according to the invention is preferably carried out at temperatures in the range from 50 °C to 350 °C, particularly preferably of 100 °C to 300 °C, in particular of 120 °C to 270 °C. It is very particularly preferable to carry out the crosslinking according to the invention in steps at temperatures of 120 °C to 270 °C.

Crosslinking can be accelerated by increasing the temperature and shaping and crosslinking can therefore also be performed in a common step.

The shaped articles according to the invention are preferably fiber composites.

The present invention further provides a process for producing fiber composite materials, characterized in that the compositions according to the invention are shaped and crosslinked.

The compositions of (A) and (B) according to the invention preferably cure to afford thermosets having macroscopically homogeneous transparency.

The compositions according to the invention may be solid or liquid at 100 °C and 1013 hPa and are preferably liquid at 100 °C and 1013 hPa.

If the compositions according to the invention are liquid at 100 °C and 1013 hPa they have a dynamic viscosity of preferably more than 1 and less than 5000 mPa s, preferably more than 1 and less than 2000 mPa s, particularly preferably more than 1 and less than 1000 mPa s, in particular more than 1 and less than 500 mPa s, in each case at 100 °C and 1013 hPa.

In the context of the present invention dynamic viscosity is determined according to DIN 53019 at a temperature of 23 °C and an air pressure of 1013 hPa unless otherwise stated. Measurement is performed on a "Physica MCR 300" rotational rheometer from Anton Paar. A coaxial cylinder measuring system (CC 27) with an annular measuring gap of 1.13 mm is used for viscosities of 1 to 200 mPa s and a cone-plate measuring system (Searle system with CP 50-1 measuring cone) is used for viscosities of greater than 200 mPa s. The shear rate is adapted to the polymer viscosity (1 to 99 mPa s at 100 $s^{-1}$; 100 to 999 mPa s at 200 $s^{-1}$; 1000 to 2999 mPa s at 120 $s^{-1}$; 3000 to 4999 mPa s at 80 $s^{-1}$; 5000 to 9999 mPa s at 62 $s^{-1}$; 10 000 to 12 499 mPa s at 50 $s^{-1}$; 12 500 to 15 999 mPa s at 38.5 $s^{-1}$; 16 000 to 19 999 mPa s at 33 $s^{-1}$; 20 000 to 24 999 mPa s at 25 $s^{-1}$; 25 000 to 29

999 mPa s at 20 $s^{-1}$; 30 000 to 39 999 mPa s at 17 $s^{-1}$; 40 000 to 59 999 mPa s at 10 $s^{-1}$; 60 000 to 149 999 at 5 $s^{-1}$; 150 000 to 199 999 mPa s at 3.3 $s^{-1}$; 200 000 to 299 999 mPa s at 2.5 $s^{-1}$; 300 000 to 1 000 000 mPa s at 1.5 $s^{-1}$.

After temperature control of the measuring system to the measurement temperature a three-stage measurement program consisting of a running-in phase, a pre-shearing and a viscosity measurement is employed. The running-in phase comprises gradually increasing the shear rate over one minute to the abovementioned expected viscosity-dependent shear rate at which the measurement is to be made. Once said shear rate has been attained this is followed by pre-shearing at constant shear rate for 30 s before 25 individual measurements are performed for 4.8 s each to determine viscosity, an average thereof being taken. The average is the dynamic viscosity reported in mPa s.

After storage at 230 °C for 800 hours the cured thermoset compositions of (A) and (B) according to the invention exhibit a weight loss which is by preference not more than 100%, preferably not more than 80%, particularly preferably not more than 60% and in particular not more than 40% higher compared to the corresponding unmodified cyanate ester resins (A).

After storage in water at 70 °C for 2000 hours the cured thermoset compositions of (A) and (B) according to the invention exhibit a water absorption which is by preference at least 10%, preferably at least 20%, particularly preferably at least 30% and in particular at least 40% lower compared to the corresponding unmodified cyanate ester resins (A).

The quotient of the flexural modulus of elasticity E of the cured compositions of (A) and (B) according to the invention relative to the respective cured, unmodified cyanate ester resin (A) is preferably less than 1, in each case measured at 23 °C.

The quotient of the stress intensity factor $K_{Ic}$ of the cured compositions of (A) and (B) according to the invention relative to the respective cured, unmodified cyanate ester resin (A) is preferably more than 1, in each case measured at 23 °C.

The compositions according to the invention have the advantage that they are producible from readily available raw materials and in simple fashion.

The shaped articles according to the invention have the advantage that they are thermally stable and have a reduced fire loading compared to composite materials comprising purely organic, cyanate ester-based binders.

The shaped articles according to the invention have the advantage that they exhibit a markedly reduced water absorption and thus a better hydrolysis resistance.

The shaped articles according to the invention have the advantage that they have a high thermo-oxidative stability.

The compositions according to the invention have the advantage that they allow the production of so-called composites which have a high temperature resistance, a high glass transition temperature, a high stiffness and a high fracture toughness expressed in terms of the critical stress intensity factor ($K_{Ic}$).

The compositions according to the invention have the advantage that the processing thereof does not result in harmful emissions to the extent typically occurring with cyanate ester resins employed according to the prior art.

EXEMPLARY EMBODIMENTS

The examples which follow describe how the present invention may be performed in principle but without limiting said invention to what is disclosed therein.

The examples which follow were performed at a pressure of the ambient atmosphere, i.e. at approximately 1000 hPa, and at room temperature, i.e. about 20 °C, or a temperature established upon combining the reactants at room temperature without additional heating or cooling.

Weight-Average Molar Mass Mw

In the context of the present invention the weight-average molar mass Mw, rounded to whole 10s in accordance with DIN 1333:1992-02, section 4, is determined using size exclusion chromatography (SEC/GPC) in accordance with DIN 55672-1/ISO 160414-1 and ISO 160414-3 by calibrating against polystyrene standards a column set based on polystyrene-co-divinylbenzene as the stationary phase and composed of three columns of different pore size distribution in the sequence 10 000 Å, 500 Å and 100 Å with an exclusion size of greater than 450 000 g/mol. Phenyl-containing components are determined with THF as eluent, non-phenyl-containing components with toluene as eluent. The analyzes are performed at a column temperature of 40±1 °C and using a refractive index detector.

Production of the Test Specimens

The cyanate ester resin (A) was initially heated to 100 °C with stirring for better processability. Cyclosiloxane (B) was then added, the mixture was then homogenized at 120 °C for 1 hour, then degassed at a pressure of 10 mbar for one hour at 120 °C and, after breaking of the vacuum with nitrogen, immediately filled while hot into a 2-part screw-closure aluminum mold preheated to 120 °C; mold cavity dimensions were 100 mm×12.7 mm×2.5 mm (length×width×height) for producing the test specimen for the flexural test and 200 mm×100 mm×6.5 mm (length×width×height) for producing the test specimen for determining fracture toughness, water absorption and thermooxidative stability. To prevent sticking and leakage the mold cavity surface on the inside of the mold was treated with a polytetrafluoroethylene spray and a 2 mm-thick round cord made of fluororubber having a hardness of 75 shore A was placed around the mold cavity. For curing, the filled molds were stored in a convection oven according to the following temperature program:

1) 18 hours curing at 180 °C.
2) Temperature increase over 30 minutes to 200 °C.
3) 3 hours curing at 200 °C.
4) Temperature increase over 30 minutes to 240 °C.
5) 2 hours curing at 240 °C.

The test specimens were then allowed to cool in the molds to ambient temperature before being demolded. For further use the top 10 mm of the vulcanizate side, which was open and exposed to air during curing in the mold, was cut off and discarded. The test specimens for measurement of fracture toughness, water absorption and thermooxidative stability were then cut out of the large vulcanizate sheet of 6.5 mm in height in the appropriate dimensions of length×width, so that all four test specimen lateral surfaces of 6.5 mm in height were sawn; the test specimens of 1.00 mm in thickness for measuring water absorption were cut out of the pre-sawn piece with an inner hole diamond saw, so that all six surfaces were sawn for these test specimens.

Fracture Toughness $K_{IC}$

Measurement of fracture toughness/the critical stress intensity factor $K_{IC}$ was performed as described in the publication "Reactive and Functional Polymers 142 (2019) 159-182" at 23 °C and 50% relative humidity; the thickness of the specimens was 6.5 mm. The value for fracture toughness $K_{IC}$ reported in table 1 was reported in $MN \times m^{-3/2}$ and rounded to three decimal places in accordance with DIN 1333:1992-02, section 4.

Flexural Modulus of Elasticity E

In the present invention the flexural modulus of elasticity was measured according to ISO 178:2011-04 method A with a test speed of 2 mm/min at a contact distance L of 38 mm. The measurements were performed at 23 °C and 50% relative humidity. Cuboidal test specimens having dimensions of length×width×thickness=60.0 mm×12.7 mm×2.5 mm were used. The measurements were each performed on 5 test specimens. The value reported in table 1 for the flexural modulus of elasticity E in GPa is the respective average of the individual measurements rounded to one decimal place in accordance with DIN 1333:1992-02, section 4.

Water Absorption

In the present invention the gravimetric determination of water absorption employed cuboidal test specimens having dimensions of length×width×thickness=30.00 mm×17.00 mm×1.00 mm; the precision of the weight determination was +0.01 mg. The test specimens were initially dried to constant weight in a vacuum oven at 70 °C and 30 mbar, wherein weight was determined at intervals of 24 hours. The specimens were considered “dry” if no further weight loss was measured over a period of 48 hours. One dry test specimen in each case was then immersed in 45 ml of deionized water in a suitable sealable vessel; the sealed vessel was then placed in a convection oven preheated to 70 °C and maintained at this temperature throughout the test period. After 2000 hours the specimens were removed, cooled to ambient temperature and the surfaces wiped dry with a cloth; the weight of the test specimens was then redetermined. Water absorption was calculated according to $$\left(\frac{\text{Gewicht nach Wasserlagerung in g}}{\text{Gewicht nach Trocknung und vor Wasserlagening in g}} - 1\right);$$

table 1 reports the value for water absorption in 00 and rounded to two decimal places in accordance with DIN 1333:1992-02, section 4.

Thermooxidative Stability

In the present invention the gravimetric determination of thermooxidative stability employed cuboidal test specimens having dimensions of length×width×thickness=12.00 mm×6.50 mm×6.50 mm; the precision of the weight determination was +0.01 mg. The test specimens were initially dried to constant weight in a vacuum oven at 70 °C and 30 mbar, wherein weight was determined at intervals of 24 hours. The specimens were considered “dry” if no further weight loss was measured over a period of 48 hours. The test specimens were then stored in a convection oven at 230 °C. After 800 hours the test specimens were removed and the weight of the test specimens redetermined. Water absorption was calculated according to $$\left(\frac{\text{Gewicht nach 230 °C-Lagerung in g}}{\text{Gewicht nach Trocknung und vor 230 °C-Lagerung in g}} - 1\right);$$

table 1 reports the value for water absorption in % and rounded to two decimal places in accordance with DIN 1333:1992-02, section 4.

Example B1

85 g of 2,2-bis(4-cyanatophenyl)propane (CAS 1156-51-0; commercially available from TCI Deutschland GmbH, D-65760 Eschborn) as component (A) and 15 g of octaphenylcyclotetrasiloxane (CAS 546-56-5; commercially available from Sigma-Aldrich Chemie GmbH, D-Steinheim) as component (B) were mixed together as described under “Production of the test specimens”, poured into molds and cured. This afforded a homogeneous, transparent vulcanizate that showed no sweating of the siloxane component at the surface.

Comparative Example V1

The procedure described in Example 1 was repeated with the exception that no octaphenylcyclotetrasiloxane was added to component (A).

TABLE 1

| | Example | |
|---|---|---|
| | B1 | V1 |
| Flexural modulus of elasticity E at 23 °C [GPa] | 2.5 | 3.0 |
| Stress Intensity Factor $K_{IC}$ at 23 °C [MN × $m^{-3/2}$] | 0.535 | 0.505 |
| Water absorption at 70 °C after 2000 hours [%] | 1.65 | 3.29 |
| Thermooxidative stability at 230 °C after 800 hours [%] | −3.48 | −2.61 |

The invention claimed is:

1. A process for producing a cross-linkable composition, comprising:

providing a (A) at least one organic compound free of siloxane units having at least two reactive cyanate ester groups (N≡C—O—);

providing (B) at least one cyclosiloxane of general formula (I)

$$[R_aR^1_bSiO_{2/2}]_m, \quad (I)$$

wherein R may be identical or different and represents monovalent, SiC-bonded, saturated aliphatic hydrocarbon radicals;

wherein $R^1$ may be identical or different and represents monovalent, SiC-bonded, optionally halogen-or phosphorus-substituted, aromatic hydrocarbon radicals;

wherein a is 0, 1 or 2;

wherein b is 0, 1 or 2;

wherein m is 3, 4 or 5;

wherein a+b is 2 and at least three radicals $R^1$ are present per siloxane molecule (B);

mixing individual the components in any desired sequence;

producing a shaped article by shaping the cross-linkable composition;

curing the shaped article; and wherein a cured thermoset formed from the cross-linkable composition exhibits a water absorption which is at least 40% lower compared to the corresponding unmodified cyanate ester resin (A), when measured after storage in water at 70 °C for 2000 hours.

2. The process of claim 1, wherein the composition produced is used in preparing a shaped article.

3. A shaped article, comprising:

wherein the shaped article comprises a cross-linkable composition;

wherein the cross-linkable composition comprises (A) at least one organic compound and (B) at least one cyclosiloxane;

wherein the (A) at least one organic compound is free of siloxane units having at least two reactive cyanate ester groups (N≡C—O—);

wherein the (B) at least one cyclosiloxane is represented by a of general formula (I)

$$[R_aR^1_bSiO_{2/2}]_m, \quad (I)$$

wherein R may be identical or different and represents monovalent, SiC-bonded, saturated aliphatic hydrocarbon radicals;

wherein $R^1$ may be identical or different and represents monovalent, SiC-bonded, optionally halogen-or phosphorus-substituted, aromatic hydrocarbon radicals;

wherein a is 0, 1 or 2;

wherein b is 0, 1 or 2;

wherein m is 3, 4 or 5;

wherein a+b is 2 and at least three radicals $R^1$ are present per siloxane molecule (B); and wherein a cured shaped article is formed from a cured cross-linkable composition has a water absorption which is at least 40% lower compared to the corresponding unmodified cyanate ester resin (A), when measured after storage in water at 70 °C for 2000 hours.

4. The shaped article of claim 3, wherein the cross-linkable composition further comprises (E) at least one filler.

5. The shaped article of claim 3, wherein the at least one organic compound (A) is a monomeric dicyanate or an oligomeric novolac cyanate.

6. The shaped article of claim 3, wherein the cross-linkable composition further comprises (D1) at least one epoxy resin and (E1) at least one fiber-reinforcing filler.

7. The process of claim 1, wherein the cross-linkable composition further comprises (E) at least one filler.

8. The process of claim 1, wherein the at least one organic compound (A) is a monomeric dicyanate or an oligomeric novolac cyanate.

9. The process of claim 1, wherein the cross-linkable composition further comprises (D1) at least one epoxy resin and (E1) at least one fiber-reinforcing filler.

* * * * *